Dec. 10, 1968   W. D. YOUNG   3,416,024
DIFFERENTIAL OUTPUT INCANDESCENT LAMP
Filed May 31, 1966
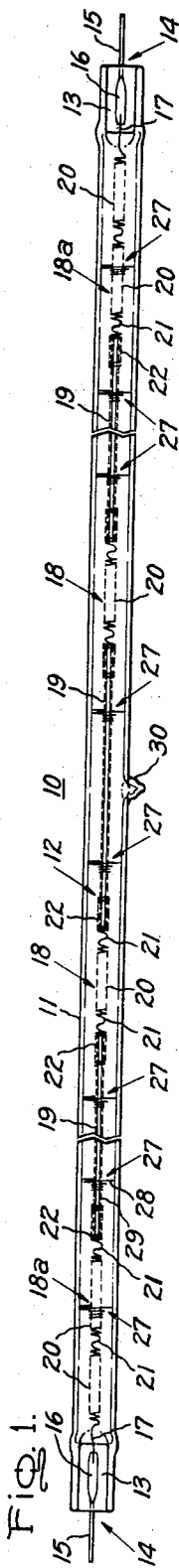
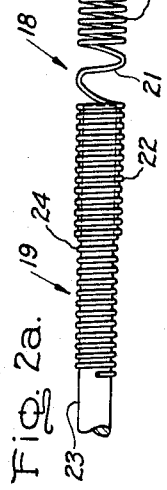
Inventor:
Warren D. Young
by Otto Fuchs
His Attorney United States Patent Office 3,416,024
Patented Dec. 10, 1968

3,416,024
DIFFERENTIAL OUTPUT INCANDESCENT LAMP
Warren D. Young, South Euclid, Ohio, assignor to General Electric Company, a corporation of New York
Filed May 31, 1966, Ser. No. 553,975
9 Claims. (Cl. 313—273)

This invention relates generally to incandescent lamps. More particularly, this invention relates to tubular lamps comprising a sealed elongated tubular radiation-transmissive envelope, and a filament assembly extending longitudinally of the envelope and which emits a differential output of radiant energy along its length.

These lamps are particularly applicable to photoreproductive processes, for example, where the sheet to be reproduced is subjected to a beam of radiation and the image is optically transferred to a radiation sensitive copy sheet. As the sheet to be reproduced moves past an elongated lamp, the center portions are irradiated not only from the center of the lamp but also from the ends; therefore, if the energy output is constant along its length, the edges of the paper will not receive as much energy as the center. In such cases, it is necessary to increase the radiant energy output at the ends of the lamp or reduce the output from the center, or both, to correct for the optical cosine losses and the end fall-off. In another photoreproductive process, an ellipsoidal reflector is used with an elongated lamp at one focus; hence, an extremely uniform source of radiant energy must be projected to the opposite focus. Thus, in each of the different processes a certain specific contour of radiant energy must be reproduced by the differential output lamp. In each case the design of the photoreproductive machine dictates certain characteristics which must be considered in the design of the differential output lamp, namely—watts, color temperature and volts for a given length of radiation emission from the lamp.

Therefore an object of this invention is to provide a lamp structure which is capable of giving a very specific desired contour of radiant energy and which is made from components which can be easily assembled in various ways to yield other desired contours.

There are several possible methods of varying the radiation output along the length of an elongated incandescent lamp, for example: (1) the number of helical turns per inch along the length of the lamp filament can be varied which results in concentrations of radiant energy output at the places where there are the higher number of turns per inch; however, this method leads to problems in supporting such a structure over a long length of lamp; (2) a uniformly coiled filament may have different areas rendered ineffective for producing radiant energy by placing conductive rods or wires within the interior of the coil to short-circuit the coil turns; however, this has the disadvantage of requiring welding to hold the rods and also special provisions for precisely locating the rod along the filament coil length.

Further objects of my invention are, therefore, to provide a differential output lamp which does not require welding of the coil with its resulting recrystallization and embrittlement, to improve the support of the active filament, to reduce the number of supports on the active filament, and to provide a construction which is easily assembled in various combinations of filament coil lengths and spacing with parts capable of manufacture on standard available machinery.

Briefly stated and in accordance with one aspect of the invention, the above-stated objects are achieved by providing a filament assembly composed of a series of radiant filament sections and non-radiant supporting connectors. Each filament section comprises an incandescible active segment, a leg portion at one or both ends thereof to which a supporting connector can be attached, and an intermediate barrier or blocking portion between the active segment and the leg portion or portions. The supporting connectors, which are non-incandescible, electrically connect and mechanically engage the leg portions for their full lengths up to the intermediate barrier portions. The number and arrangement of supporting connectors and filament sections may readily be varied to distribute the lighted sections in a manner to provide virtually any desired radiant energy contour.

In accordance with a further aspect of the invention, the intermediate barrier portion is preferably formed by a distortion of one or more turns of an otherwise uniformly coiled filament, as by flattening or by materially altering the pitch of the one or more turns. In accordance with a still further aspect of the invention, the supporting connectors frictionally engage the interiors of the said leg portions of the filament sections, preferably by virtue of a screw thread engagement therewith.

Further features and advantages of the invention will appear from the following detailed description to be read in conjunction with the following drawing wherein like reference symbols denote corresponding parts throughout the several views.

FIG. 1 is a side elevation of an elongated lamp which illustrates an embodiment of the invention.

FIG. 1a is a schematic view of the filament of FIG. 1 in a preliminary stage of manufacture.

FIG. 2a is a fragmentary side view on an enlarged scale, of the filament assembly in FIG. 1 showing more clearly the engagement of a supporting connector and a filament section.

FIG. 2b is a fragmentary side view of a filament assembly having a modified form of supporting connector.

FIG. 3 shows another form of filament configuration.

FIG. 3a is a schematic view of the FIG. 3 filament in a preliminary stage of manufacture.

Referring to FIG. 1 of the drawing, an incandescent lamp 10 shown therein comprises an elongated tubular envelope 11 of radiation transmissive material such as quartz, a filament assembly 12 extending longitudinally and axially of the envelope 11, and pinch seals 13 at the ends of envelope 11 having lead-in conductors 14 hermetically sealed therein and extending therefrom. Each lead-in conductor 14, preferably of molybdenum, has a straight wire portion 15 and a flat foil portion 16 which is hermetically sealed in pinch seal 13 and to which is welded the end of a straightened wire end leg 17 of the filament.

In addition, the envelope 11 usually contains a filling of inert gas, such as argon, and it may also contain a small quantity of halogen. The halogen is used to produce a regenerative cycle whereby the evaporated tungsten from the filament reacts with the halogen gas or vapor and is redeposited on the filament. The regenerative cycle employing iodine is more fully discussed and disclosed in Patent 2,883,571—Fridrich et al. Non-halogen type heat lamps are more fully described in Patent 2,864,025 to A. G. Foote et al.

In the particular form shown in FIG. 1, in accordance with the invention, the filament assembly 12 comprises central filament sections 18, end filament sections 18a, and supporting connectors 19. Each central filament section 18 comprises an active segment 20 (see FIG. 2a) which is a helically coiled (preferably tungsten) wire which, in operation, provides the radiant energy, a pair of intermediate barrier or blocking portions 21 which, as herein illustrated, are helically coiled wire of open pitch having a fewer number of turns per inch than the active segment 20, and a pair of leg portions 22 which in this case have the same pitch or number of turns per inch as the active segment 20. Each end section 18a comprises two active segments 20 separated by intermediate portion 21 of open pitch, a leg portion 22 at the inner end only of the section and spaced from the adjacent segment 20 by the intermediate barrier portion 21 of open pitch, and an end leg portion 17 of straightened filament wire at the outer end of the section which connects the filament with the foil portion 16 of the lead-in wire 14. The filament sections 18a at the ends of the lamp do not necessarily require the intermediate portion 21 between the two active segments 20; however, this is an inherent result of a convenient preferred method of manufacture as will be explained later. By virtue of the fact that the intermediate barrier portion 21 has fewer turns per inch, the preferably threaded supporting connector 19 which frictionally engages the interior of leg portion 22 is blocked from contacting the active segment 20; however, this function can also be performed in other ways, such as, by the intermediate portion 21 being crimped, being a solid portion, having a greater number of turns per inch, a smaller coil turn diameter, or in any other way which blocks the supporting connector 19.

As shown in FIG. 2a, the supporting connector 19 comprises a rod 23 which is preferably screw threaded by virtue of an overwind wire 24. The overwind 24 is helically wound to a pitch having the same or approximately the same number of turns per inch as the leg portion 22 to provide a screw-in attachment to said leg portion 22 and to short circuit the coil turns of said leg portion 22 to prevent them from incandescing. The overwind 24 may extend the entire length of rod 23, as shown, or it may be just long enough for engagement with the full length of leg portion 22. Another form by which this screw-type engagement may be accomplished is shown in FIG. 2b wherein the supporting connector 19' is a rod 23', preferably of tungsten, having screw threads 26 formed integral therewith for attachment to the leg portion 22.

The filament assembly 12 is maintained axially along the envelope 11 by supports 27 as shown in FIG. 1. Each support 27 may comprise a single wire having an outer coil portion 28 engaging the inner wall of the envelope. A central portion 29 firmly engages the rod portion 23 of the supporting connector 19, or is engaged between the turns of an active segment 20 of the elongated outer filament section 18a; however, in either case, the support is preferably secured by means of secondary helical locking turns in the central portion 29. Such supports 27 are more fully described and illustrated in Patent 3,168,670—Levand, Jr. The supports 27 may be applied only to the supporting connectors 19, except, perhaps, for long filament segments or sections such as those at the ends of the lamp; thereby, the efficiency of the filament sections 18 is increased due to the reduction in the number of supports 27 contacting the active segments 20. In a heat lamp of the type shown in the aforesaid Foote et al. patent the supports may be in the form of discs such as those shown in Patent 2,813,993 to Fridrich.

FIG. 1 and FIG. 3 illustrate two modifications or configurations of filament assembly which increase the radiant energy output at the ends of the lamp. More specifically, it will be evident that in FIG. 1 the two active and closely spaced segments 20 at each end produce more light per unit length of envelope 11 than the individual active segments 20 which are widely separated at the middle of the lamp. There is an even more pronounced relative increase in end output of radiant energy in the filament configuration shown in FIG. 3 where long active segments 20b are provided at each end and no active segment is provided at the middle of the lamp. To connect the two active segments by a length of wire the same size as the segments would introduce problems of adequate support, and would reduce the efficiency of the lamp since a straight incandescent wire offers increased resistance and emits light very inefficiently. It will be further evident that in both of these filament assemblies, the same filament sections 18 can readily be redistributed by merely changing the length of the supporting connectors 19. In a halogen cycle type lamp, the limiting value for the overall length of a connector appears to be only that which results in the lowering of the bulb wall temperature below a value (250° C. for iodine) at which the halogen cycle becomes ineffective.

The following is an example of a method of producing lamp 10 (FIG. 1) to illustrate the design and manufacturing flexibility inherent in the new structure. First, (FIG. 3) a long continuous length of filament wire is helically coiled on conventional equipment to form a total of nine similar segments ( shown as rectangular blocks) separated by open pitch portions 21. One or two end turns are pulled out to form legs 17, and the supports 27 are mounted in place. The third, fifth and seventh segments are cut near their centers (as indicated by arrows 30) resulting in each half segment becoming a leg portion 22, one leg 22 for each end section 18a and two legs for each of two center sections 18. The filament sections 18 and 18a for each lamp are preferably wound from the same single length of wire to avoid variations in the diameter of the wire which would cause certain sections to produce more radiant energy than others and which would not give the desired contour of radiation.

A rod or thick wire 23 is wound with an overwind wire 24 which has approximately the same number of turns per inch as the filament leg portions 22 and is cut to appropriate lengths. Since the length of the active segments 20 was determined during coiling, the important point in assembly is to make sure that the ends of the connectors 19 are screwed completely into the filament leg portions 22 so as to prevent those portions from incandescing, and also to assure the proper overall length of the filament assembly.

Prior to the connecting of the supporting connectors 19 to the filament sections 18 and 18a, the filament sections 18a with supports 27 attached thereto are heat treated to eliminate sag during lamp operation. The connectors 19, which provide the main support for the filament sections 18, are preferably heated and straightened, and thereafter, the supports 27 are attached to them without heat treatment so that they remain resilient.

After the filament assembly 12 has been assembled by screwing the parts together and attaching the lead-in wires 14, it is inserted inside the envelope 11. The filament assembly is also stretched a predetermined amount to place it in tension to avoid sagging during operation of the lamp. The ends of the envelope are pinch sealed in the conventional manner which hermetically seals the lead-ins 14. An inert gas, preferably argon, is supplied through the exhaust tube, along with a small amount of halogen gas or vapor when used, and the exhaust tube is then tipped off at 30.

It will be evident that in the finished lamp 10 the support of the incandescent active filament segments is improved due to the fact that most of the support members 27 were not annealed. In addition, no welding is required for assembly and, therefore, embrittlement of the filament is avoided. Moreover, the lamp is composed of standard parts from which a variety of different filament configurations (hence a variety of radiant energy contours) may be produced.

In manufacturing the filament assembly shown in FIG. 3, a single length of tungsten wire is helically coiled as shown in FIG. 3a to form only two ultimate filament sections 18b, by coiling two long segments 20b and one shorter intermediate segment 22b—22b which are separated by the intermediate blocking portions 21b of open pitch. The short segment is severed at its center, as indicated by the arrow 30b, to form the coiled leg portion 22b at the inner end of each long active segment 20b. As shown in FIG. 2, the filament sections 18b are electrically connected by an elongated supporting connector 19b like the connectors 19 of FIGS. 1 and 2, the straight end legs 17b are welded to lead-in conductors 14b, and the filament assembly is sealed in an envelope as described above in connection with FIG. 1.

What I claim as new and desire to secure by Letters Patent of the United States is:

1. A differential output tubular incandescent lamp comprising
    an elongated tubular envelope of radiation-transmissive material, and
    a filament assembly extending longitudinally of said envelope and comprising a plurality of helically coiled incandescible filament sections longitudinally spaced apart and an electrically conducting but non-incandescible rod-like supporting connector between said filament sections,
    said filament sections each comprising an active coiled segment which is the effective source of radiant energy,
    a coiled leg portion at least at one end thereof, and an intermediate barrier portion between said active segment and leg portion which serves to isolate the active segment from contact by said supporting connector,
    said supporting connector having its ends electrically connected to and frictionally engaging the full length of respective said leg portions to be in abutting engagement with respective said intermediate barrier portions so that the turns of said leg portions are short-circuited and nonincandescible.

2. A differential output tubular incandescent lamp as set forth in claim 1 wherein
    said connector is provided at least at its ends with screw threads in screw mesh engagement with the interior of respective coiled leg portions.

3. A differential output tubular incandescent lamp as set forth in claim 2 wherein
    the said intermediate barrier portion of the coiled filament section is a short portion of the coil having an open pitch of significantly lesser turns per inch than the remainder of said section.

4. A differential output tubular incandescent lamp as set forth in claim 2 wherein
    the screw threads on said connector are formed by an overwind wire on the rod wound to the same pitch as said coiled leg portions.

5. A differential output tubular incandescent lamp as set forth in claim 1 wherein
    support members are attached to said connector and are engageable with the inner wall of the envelope to support the filament assembly in axial alignment therein.

6. A differential output tubular incandescent lamp as set forth in claim 1 wherein
    said connector is provided at least at its ends with screw threads in screw mesh engagement with the interior of respective coiled leg portions,
    and support members are attached to said connector and are engageable with the inner wall of the envelope to support the filament assembly in axial alignment therein.

7. A differential output tubular incandescent lamp comprising
    an elongated tubular envelope of radiation-transmissive material having the ends sealed,
    a pair of lead-in conductors having portions thereof hermetically sealed in said sealed envelope ends and extending outwardly therefrom,
    a filament assembly extending longitudinally of said envelope and comprising a plurality of helically coiled incandescible filament sections longitudinally spaced apart, and at least one electrically conducting but non-incandescible rod-like supporting connector between said filament sections and provided at least at its ends with screw threads,
    said filament sections including at least two elongated sections located at respective ends of the envelope and each comprising an active coiled segment which is the effective source of radiant energy and has its outer end electrically connected to the adjacent lead-in conductor, a coiled leg portion at the inner end of said section, and an intermediate barrier portion between said active segment and leg portion which serves to isolate the active segment from contact by a supporting connector,
    said supporting connector having its screw thread ends in screw mesh engagement with the full length of respective said leg portions to be in abutting engagement with respective said intermediate barrier portions so that the turns of said leg portions are short-circuited and non-incandescible.

8. A differential output tubular incandescent lamp as set forth in claim 7 wherein
    said filament sections further include a plurality of shorter sections spaced apart at the middle of the lamp between said elongated sections and each comprising a central active coiled segment which is the effective source of radiant energy, a coiled leg portion at each end of said section, and an intermediate barrier portion between said central active segment and each said leg portion,
    and a plurality of supporting connectors each interposed between successive filament sections and having their screw threaded ends in screw mesh engagement with the full length of respective leg portions of said successive filament sections to be in abutting engagement with associated said intermediate barrier portions so that the turns of said leg portions are short-circuited and non-incandescible.

9. A differential output tubular incandescent lamp as set forth in claim 8 wherein
    support members are attached to each of said connectors and to the two elongated filament sections to the exclusion of said shorter filament sections and are engageable with the inner wall of the envelope to support the filament assembly in axial alignment therein.

References Cited

UNITED STATES PATENTS

| | | |
|---|---|---|
| 2,449,679 | 9/1948 | Van Horn. |
| 2,864,025 | 12/1958 | Foote et al. _____ 313—311 X |
| 3,225,247 | 12/1965 | Audesse et al. |

JOHN W. HUCKERT, *Primary Examiner.*

J. R. SHEWMAKER, *Assistant Examiner.*

U.S. Cl. X.R.

313—315